(12) United States Patent
Okada et al.

(10) Patent No.: US 8,994,313 B2
(45) Date of Patent: Mar. 31, 2015

(54) INJECTION MOLDING MACHINE (75) Inventors: Noritaka Okada, Kanagawa (JP);
Hiroshi Morita, Kanagawa (JP);
Hiroyuki Mizuno, Kanagawa (JP);
Atsushi Kato, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 153 days.

(21) Appl. No.: 13/556,320

(22) Filed: Jul. 24, 2012

(65) Prior Publication Data

US 2013/0026961 A1 Jan. 31, 2013

(30) Foreign Application Priority Data

Jul. 26, 2011 (JP) ................ 2011-163698

(51) Int. Cl.
*G05B 11/01* (2006.01)
*H02P 6/00* (2006.01)
*B29C 45/76* (2006.01)
*B29C 45/17* (2006.01)

(52) U.S. Cl.
CPC ............ *H02P 6/00* (2013.01); *B29C 45/7666* (2013.01); *B29C 2045/1792* (2013.01); *B29C 2045/7673* (2013.01)
USPC .......................................... 318/629; 318/727

(58) Field of Classification Search
USPC ............... 318/727, 798, 800, 801, 805, 629, 318/400.3
See application file for complete search history.

(56) References Cited

U.S. PATENT DOCUMENTS

| 6,850,426 | B2 * | 2/2005 | Kojori et al. ............... 363/123 |
| 7,176,648 | B2 * | 2/2007 | Choi ........................... 318/625 |
| 2009/0246307 | A1 * | 10/2009 | Ochi ........................... 425/165 |
| 2011/0175557 | A1 * | 7/2011 | Iwashita et al. ............ 318/400.3 |

FOREIGN PATENT DOCUMENTS

| JP | 62-281771 | 12/1987 |
| JP | 63-001369 | 1/1988 |
| JP | 04-261371 | 9/1992 |
| JP | H05-033640 U | 4/1993 |
| JP | H08-251947 | 9/1996 |
| JP | H11-289793 | 10/1999 |
| JP | 2000-201492 | 7/2000 |
| JP | 2003-189640 | 7/2003 |
| JP | 2005-223999 | 8/2005 |
| JP | 2006-238517 | 9/2006 |

* cited by examiner

*Primary Examiner* — Rina Duda
(74) *Attorney, Agent, or Firm* — IPUSA, PLLC (57) ABSTRACT

An injection molding machine includes a motor; a driver circuit; a rectifying part; a capacitor provided between the driver circuit and the rectifying part; a bridge circuit that converts direct electric power between the driver circuit and the rectifying part into alternating electric power; a harmonics component reducing part connected to an alternating side of the bridge circuit; and a regenerative line connected to the rectifying part in parallel, wherein the bridge circuit and the harmonics component reducing part are provided in the regenerative line, and plural switching elements of the bridge circuit are turned on or off such that electric power of the motor is regenerated when a voltage of the capacitor is greater than or equal to a predetermined value, and all the switching elements are turned off when the voltage of the capacitor is less than the predetermined value.

3 Claims, 6 Drawing Sheets

INJECTION MOLDING MACHINE

FIELD

The present invention is related to an injection molding machine which includes a motor, a driver circuit that drives the motor; a rectifying part that supplies electric power to the driver circuit; and a bridge circuit that converts direct electric power between the driver circuit and the rectifying part into alternating electric power.

BACKGROUND

Japanese Laid-open Patent Publication No. 2005-223999 discloses an electric power control device which includes a rectifying part which converts alternating electric power of a power supply into direct electric power; a capacitor connected to the output side of the rectifying part; an inverter which converts the direct electric power of the capacitor into the alternating electric power; and a collective controlling part which includes a PWM switch circuit connected to the rectifying part in parallel, wherein the collective controlling part has a harmonics removing function and an electric power regenerating function. The collective controlling part functions as an active filter to remove the harmonics of the alternating electric power of the power supply if the voltage of the capacitor is lower than a predetermined value, and functions as a power regenerating converter to supply the electric power of the capacitor to the power supply if the voltage of the capacitor is higher than the predetermined value.

However, if the PWM switch circuit is simply connected to the rectifying part in parallel as is the case with the prior art described above, a return path of the current flowing through the rectifying part is formed in the PWM switch circuit. This current is called a circulating current, and the circulating current causes power loss.

SUMMARY

An injection molding machine according to an embodiment includes a motor; a driver circuit that drives the motor; a rectifying part that supplies electric power to the driver circuit; a capacitor provided between the driver circuit and the rectifying part; a bridge circuit that converts direct electric power between the driver circuit and the rectifying part into alternating electric power; a harmonics component reducing part connected to an alternating side of the bridge circuit; and a regenerative line connected to the rectifying part in parallel, wherein the bridge circuit and the harmonics component reducing part are provided in the regenerative line, and plural switching elements of the bridge circuit are switched between ON state and OFF state such that electric power of the motor is regenerated when a voltage of the capacitor is greater than or equal to a predetermined value, and all the switching elements are turned off when the voltage of the capacitor is smaller than the predetermined value.

DESCRIPTION OF EMBODIMENTS

Figure 1:
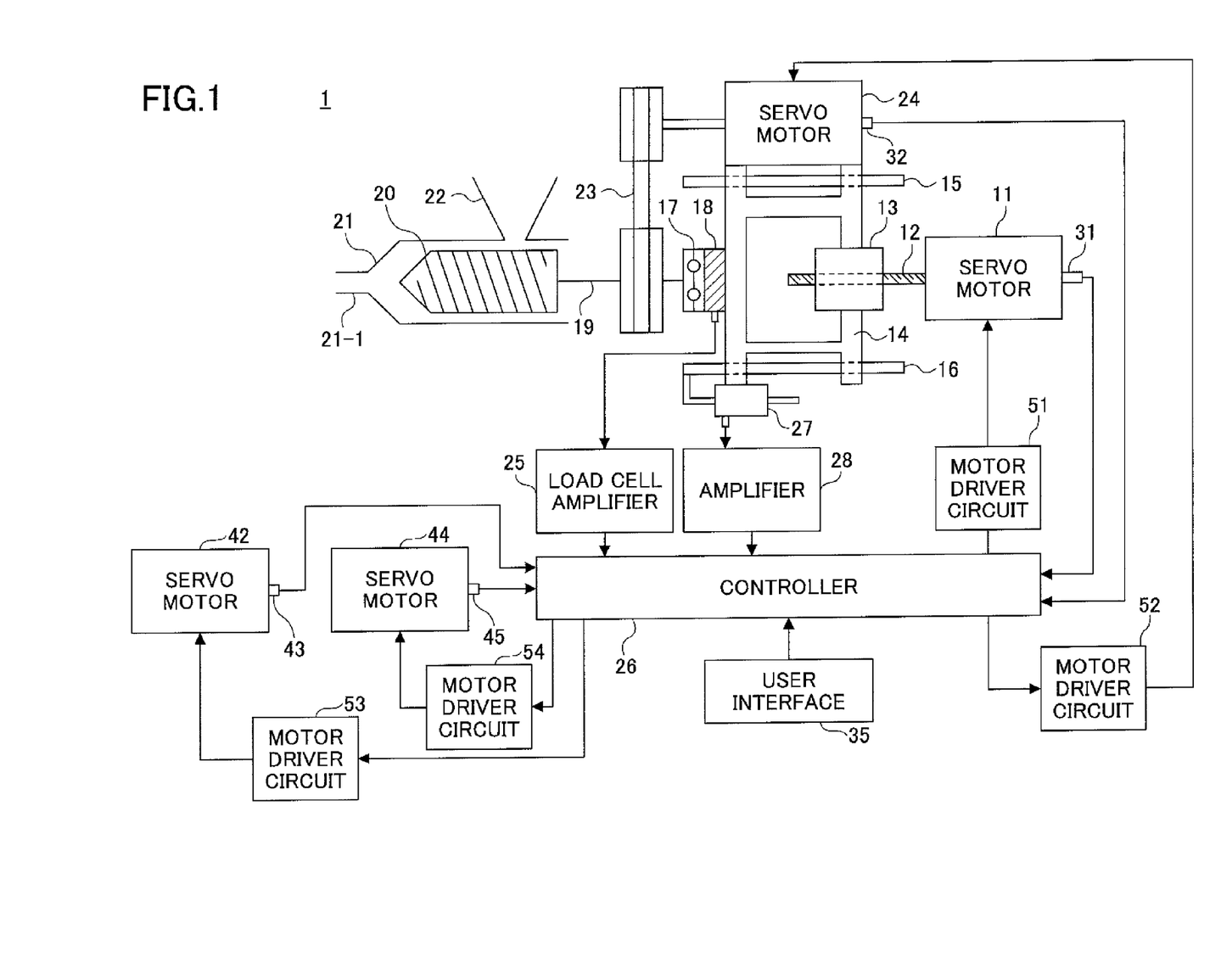
FIG. 1 is a diagram for illustrating a configuration of an injection molding machine according an embodiment of the present invention.

In the following, embodiments for carrying out the present invention will be described in detail by referring to the accompanying drawings. FIG. 1 is a diagram for illustrating a configuration of an injection molding machine 1 according an embodiment of the present invention.

The injection molding machine 1, which is a motor-operated injection molding machine in the illustrated example, includes a servo motor for injection 11. The rotation of the servo motor for injection 11 is transmitted to a ball screw 12. A nut 13, which is moved in the forward and backward directions by the rotation of the ball screw 12, is fixed to a pressure plate 14. The pressure plate 14 is configured to be movable along guide bars 15 and 16 which are fixed to a base frame (not illustrated). The motion of the pressure plate 14 in forward and backward directions is transmitted to a screw 20 via a bearing 17, a load cell 18 and an injection shaft 19. The screw 20 is disposed in a heating cylinder 21 in such a manner that it can rotate in the heating cylinder 21 and can move in an axial direction. A hopper 22 for supplying a resin is provided in a rear portion in the heating cylinder 21. The rotational motion of a servo motor for screw rotation 24 is transmitted to the injection shaft 19 via coupling members 23 such as a belt, a pulley, etc. In other words, the screw 20 is rotated when the injection shaft 19 is driven to rotate by the servo motor for screw rotation 24.

In a plasticizing/metering process, the screw 20 is rotated and moved backward in the heating cylinder 21, thereby molten resin is stored in a front portion of the screw 20, that is to say, on the side of a nozzle 21-1 of the heating cylinder 21. In an injecting process, molds (dies) are filled with the molten resin stored in the front portion of the screw 20, and molding is performed by applying pressure. At that time, a force pressing the resin is detected by the load cell 18 as a reaction force. In other words, a resin pressure in the front portion of the screw 20 is detected. The signal representing the detected pressure is amplified by a load cell amplifier 25 and input to a controller 26 (a control apparatus) functioning as controlling means. Further, in a holding process, the pressure of the resin filling in the molds is held at a predetermined pressure.

A position detector 27 for detecting an amount of movement of the screw 20 is attached to the pressure plate 14. The detection signal of the position detector 27 is amplified by an amplifier 28 and input to the controller 26. This detection signal may be used to detect a movement speed of the screw 20.

The servo motor 11 and 24 are provided with encoders 31 and 32 for detecting a number of revolutions, respectively. The numbers of revolutions detected by the encoders 31 and 32 are input to the controller 26.

A servo motor 42 is provided for opening and closing the molds, and a servo motor 44 is provided for extruding (ejecting) a molded article. The servo motor 42 drives a toggle link (not illustrated), for example, to implement the mold opening/closing. Further, the servo motor 44 moves an ejector rod (not illustrated) via a ball screw mechanism, for example, to implement the ejection of the molded article. The servo motor 42 and 44 are provided with encoders 43 and 45 for detecting a number of revolutions, respectively. The numbers of revolutions detected by the encoders 43 and 45 are input to the controller 26.

The controller 26 is comprised mainly of a microprocessor that includes a CPU, a ROM in which control programs are stored, a RAM in which calculation results are stored, a timer, a counter, an input interface, an output interface, etc., for example.

The controller 26 transmits current (torque) instructions to motor driver circuits according to the respective processes in an injection molding process. The motor driver circuits drive the servo motors 11, 24, 42 and 44 used in the respective processes according to the instructions. For example, the controller 26 controls the number of revolutions of the servo motor 24 with the motor driver circuit 52 to implement the plasticizing/metering process. Further, the controller 26 controls the number of revolutions of the servo motor 11 with the motor driver circuit 51 to implement the injecting process and the holding process. Further, the controller 26 controls the number of revolutions of the servo motor 42 with the motor driver circuit 53 to implement the mold opening process and the mold closing process. Further, the controller 26 controls the number of revolutions of the servo motor 44 with the motor driver circuit 54 to implement the molded article ejecting process.

A user interface 35 includes an input setting part with which injection molding conditions can be set for the respective processes, such as a mold opening/closing process, an injecting process, etc. Further, the user interface 35 includes an input part with which a user inputs various instructions and an output part (a display part, for example) configured to output various items of information.

Typically, a cycle of the injection molding process in the injection molding machine 1 includes a mold closing process for closing the molds; a mold clamping process for clamping the molds; a nozzle contacting process for abutting a nozzle 21-1 onto a sprue (not illustrated) of the molds; an injecting process for moving the screw 20 in the heating cylinder 21 to inject the molten resin stored in the front portion of the screw 20 into a mold cavity (not illustrated); a holding process for maintaining the dwell pressure afterward for a while so as to prevent emergence of air bubbles and sink marks; a plasticizing/metering process and a cooling process for melting the resin and storing the molten resin in the front portion of the heating cylinder 21 by rotating the screw 20 so as to prepare for the next cycle, utilizing the time until the molten resin filling in the mold cavity is cooled to set; a mold opening process for opening the molds; and a molded article ejecting process for pushing the molded article out with ejector pins (not illustrated) provided in the mold.

Figure 2:
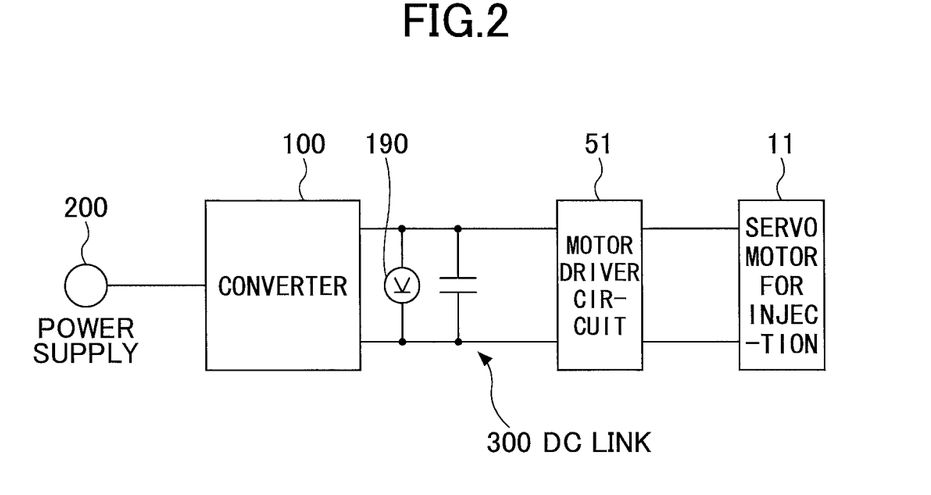
FIG. 2 is a diagram for schematically illustrating an example of a motor driving power supply circuit including a converter of the injection molding machine.

FIG. 2 is a diagram for schematically illustrating an example of a motor driving power supply circuit including a converter 100 of the injection molding machine 1. In FIG. 2, the servo motor for injection 11 and a motor driver circuit 51 for driving the servo motor for injection 11 are illustrated as an example. Other servo motors 24, 42 and 44 and the motor driver circuits 52, 53 and 54 may be the same. According to an alternative embodiment, the converter 100 may be connected to servo motors and motor driver circuits for driving the servo motors in parallel.

The converter 100 is connected to a power supply 200. The power supply 200 may be an AC power supply. Further, the converter 100 is connected to the servo motor 11 via a DC link 300 and the motor driver circuit 51. The converter 100 converts the electric power from the power supply 200 to supply the converted electric power to the servo motor 11 via the DC link 300 and the motor driver circuit 51. The motor driver circuit 51 may be an inverter for converting the output (direct electric power) of the converter 100 to a three-phase alternating electric power, for example, and the inverter may include a three-phase bridge circuit having six power transistors, for example. The DC link 300 includes a capacitor (a capacitor), a bus bar, a cable, or the like.

A voltage detecting part 190 is provided such that it detects the voltage across the DC link 300 which is provided between the output side of a rectifier 102 (see FIG. 3) and the input side of the motor driver circuit 51. The direct voltage detected by the voltage detecting part 190 is supplied to the controller 26 as the charged voltage of the capacitor 301 of the DC link 300 (see FIGS. 3 and 6).

Figure 3:
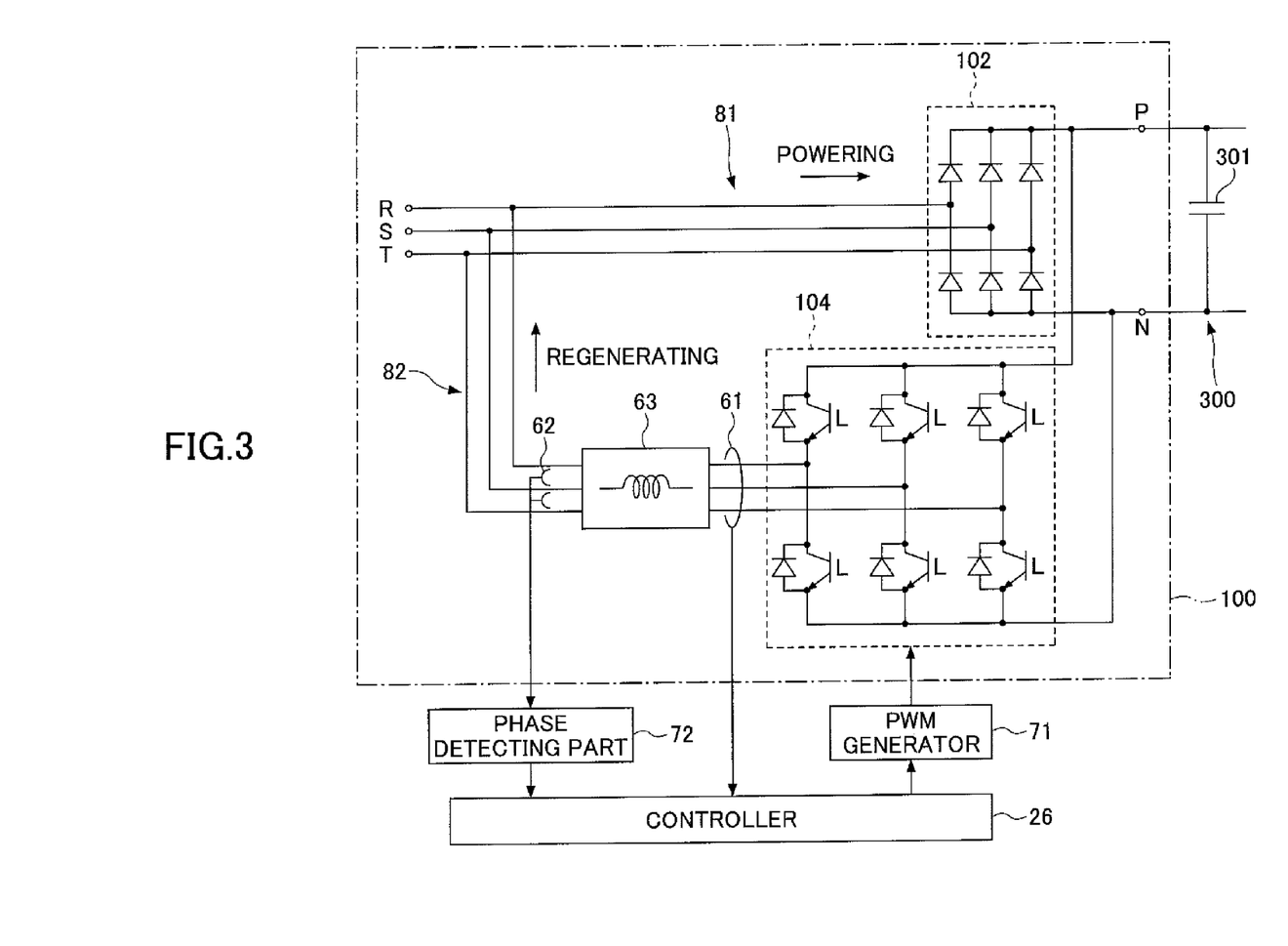
FIG. 3 is a diagram for illustrating an example of a circuit configuration of the converter.

FIG. 3 is a diagram for illustrating an example of a circuit configuration of the converter 100. In the example illustrated in FIG. 3, the converter 100 includes terminals R, S and T which are connected to the AC power supply and terminals P and N which are connected to the capacitor 301 of the DC link 300. The capacitor 301 is an electrolytic capacitor, for example. The converter 100 includes a rectifier (powering circuit part) 102 which is formed of a three-phase diode bridge including six diodes, and a bridge circuit (regenerating circuit part) 104 which is formed of a three-phase inverter including switching elements such as six transistors. It is noted that in FIG. 3 the flow of the electric power at the time of the powering mode and the flow of the electric power at the time of the regenerating mode are indicated by arrows.

The rectifier 102 performs a conversion operation (powering operation) from the alternating electric power to the direct electric power in the DC link 300 with diode rectification. The bridge circuit 104 performs a PWM (Pulse Width Modulation) control according to a driving signal output from a PWM generator 71 to implement a conversion operation (power supply regenerating operation) from the direct electric power in the DC link 300 to the alternating electric power in the alternating power supply. The bridge circuit 104 controls magnitude of the alternating electric power (alternating electric current) between the alternating power supply and the bridge circuit 104 and magnitude of the direct electric power (direct electric current) of the DC link 300 during the power supply regenerating operation.

As illustrated in FIG. 3, the converter 100 includes a regenerative line 82 connected to a powering line 81 in parallel. The powering line 81 is between the alternating power supply and the motor driver circuit and has the rectifier 102 provided therein. To the alternating input side of the rectifier 102 is input the alternating electric power of the alternating power supply, and to terminal electrodes P and N on the direct output side of the rectifier 102 is connected the capacitor 301. The regenerative line 82 is connected to the input and the output of the rectifier 102 in parallel. The regenerative line 82 has the bridge circuit 104 and a harmonics component reducing part 63 inserted in series therein. One end of the regenerative line 82 is connected to an alternating current line part of the powering line 81 on the input side of the rectifier 102, with connecting the harmonics component reducing part 63, the bridge circuit 104 and the alternating input part of the rectifier 102, and the other end of the regenerative line 82 is connected to a direct current line part of the powering line 81 on the direct output side of the rectifier 102, with connecting the direct input part of the bridge circuit 104 and the direct output part of the rectifier 102.

The bridge circuit 104 is a converting part which converts the direct electric power between the output side of the rectifier 102 and the input side of the motor driver circuit 51 (see FIG. 2) into the alternating electric power. The harmonics component reducing part 63 is connected to the alternating output side of the bridge circuit 104. The alternating electric power output by the power conversion operation of the bridge circuit 104 is input to the harmonics component reducing part 63. For example, the harmonics component reducing part 63 may function as a reactor part which has reactors inserted in series in the regenerative line 82 which is connected to midpoints between the upper switching elements and the lower switching elements of the bridge circuit 104.

Figure 4:
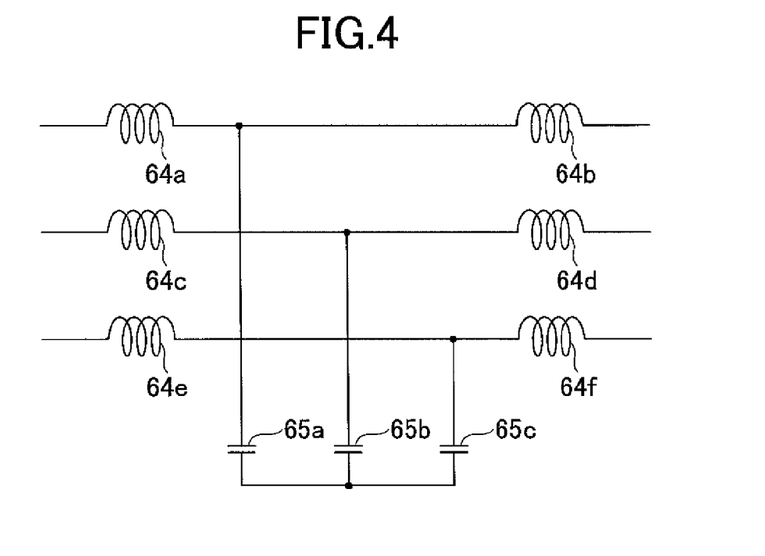
FIG. 4 is a diagram for illustrating the first configuration example of a harmonics component reducing part.
Figure 5:
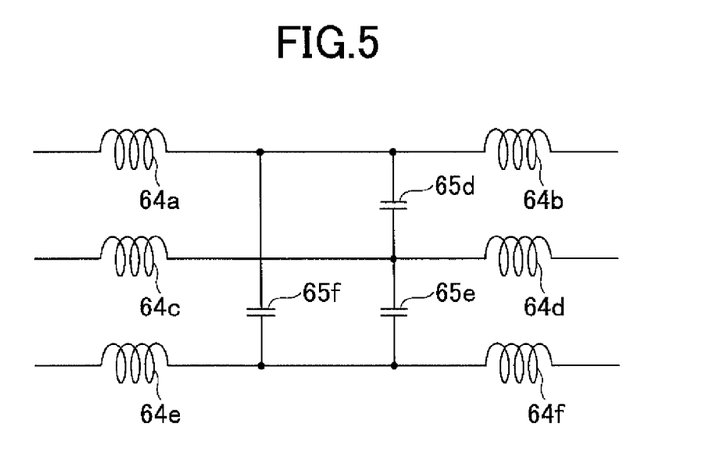
FIG. 5 is a diagram for illustrating the second configuration example of a harmonics component reducing part.

The harmonics component reducing part 63 has an LC circuit configuration in which plural inductors inserted to the respective phases of R, S and T in series are connected to capacitors (capacitors), for example. The harmonics component reducing part 63 may have a Y-connection configuration in which plural capacitors whose ends are connected to the respective phases are commonly connected at a neutral point, as illustrated in FIG. 4. The harmonics component reducing part 63 may have a delta connection configuration in which the capacitors are connected between the respective phases, as illustrated in FIG. 5. Further, the harmonics component reducing part 63 may be configured such that only the inductors are inserted to the respective phases in series, or may be configured such that resistors are inserted to the respective phases in series.

Further, the injection molding machine 1 includes, as a controlling part of the converter 100, the controller 26, the PWM generator 71 which generates a PWM driving signal, and a phase detecting part 72 which detects the phase of the alternating voltage of the alternating power supply.

If the direct voltage value Vdc detected by the voltage detecting part 190 (see FIG. 2) is higher than a predetermined threshold voltage Vth, the controller 26 performs PWM control with the PMW generator 71 such that the bridge circuit 104 functions as a power regenerating converter, thereby regenerating the electric power of the servo motor 11, which is input to the bridge circuit 104 via the motor driver circuit 51, to the power supply. The controller 26 controls the regenerating operation of the bridge circuit 104 with the PWM driving signal generated by the PMW generator 71 such that the alternating current output from the bridge circuit 104 is shaped to have a shape of a sine wave.

For example, the controller 26 controls the regenerating operation by the switching operation of the bridge circuit 104 with the PMW generator 71, based on the direct voltage value Vdc detected by the voltage detecting part 190 (see FIG. 2), the alternating current value Iacf detected by a current detecting part 61, and an alternating voltage value Vacf detected by a voltage detecting part 62, such that the alternating current output from the bridge circuit 104 has a sine wave shape with a target frequency. A phase detecting part 72 is capable of detecting the phase of the alternating voltage of the alternating power supply based on the alternating voltage value Vacf detected by the voltage detecting part 62.

For example, the controller 26 generates a sine-wave instruction value Ir of the alternating current by performing processes, such as a process of multiplying a voltage error output Vert, which is generated according to an error between an instruction value Vr of the direct voltage and the direct voltage value Vdc supplied from the voltage detecting part 190, by the alternating voltage value Vacf supplied from the phase detecting part 72. Then, the controller 26 supplies an current error output Ierr, which is generated according to an error between the sine-wave instruction value Ir and the alternating current value Iacf supplied from the current detecting part 61, to the PMW generator 71. The PMW generator 71 compares the current error output Ierr with a predetermined carrier such as a triangle wave to generate the PWM driving signal for driving the gates of the transistors of the bridge circuit 104 to implement the regenerating operation.

Further, if the direct voltage value Vdc detected by the voltage detecting part 190 (see FIG. 2) is lower than the predetermined threshold voltage Vth, the controller 26 turns off all the switching elements of the bridge circuit 104 with the PMW generator 71 to reduce a circulating current, which is the total of currents flowing through the respective phases R, S and T of the regenerative line 82, thereby reducing such a circulating current flowing through the rectifier 102.

When all the switching elements of the bridge circuit 104 are turned off, the harmonics component reducing part 63 has three terminal potentials on the side of the bridge circuit 104 changed to potential of a terminal electrode P or N (neglecting forward voltage of the diodes connected to the switching elements in parallel) such that the currents flowing through the respective phases are reduced.

Specifically, if the switching elements of the bridge circuit 104 are turned off when the current flows through the harmonics component reducing part 63 from the alternating power supply to the bridge circuit 104, the terminal potential of the harmonics component reducing part 63 on the side of the bridge circuit 104 is changed to the potential of the terminal electrode P by the diodes connected in parallel to the switching elements on the high side. If the terminal potential of the harmonics component reducing part 63 on the side of the bridge circuit 104 is changed to the potential of the terminal electrode P, the three-phase currents flowing through the harmonics component reducing part 63 are reduced. Conversely, if the switching elements of the bridge circuit 104 are turned off when the current flows through the harmonics component reducing part 63 from the bridge circuit 104 to the alternating power supply, the terminal potential of the harmonics component reducing part 63 on the side of the bridge circuit 104 is changed to the potential of the terminal electrode N by the diodes connected in parallel to the switching elements on the low side. If the terminal potential of the harmonics component reducing part 63 on the side of the bridge circuit 104 is changed to the potential of the terminal electrode N, the three-phase currents flowing through the harmonics component reducing part 63 are reduced.

In this way, by turning off all the switching elements of the bridge circuit 104, three-phase currents flowing through the harmonics component reducing part 63 are reduced and thus the circulating current, which is the total of three-phase currents, is reduced.

If the harmonics component reducing part 63 has reactors inserted in series in the current lines of the respective phases, turning off all the switching elements of the bridge circuit 104 reduces the three-phase currents flowing through the reactors and thus reduces the circulating current which is the total of three-phase currents. In other words, since energy, which is accumulated in the reactors by the currents flowing through the reactors before all the switching elements of the bridge circuit 104 are turned off, is charged to the capacitor 301, the generation of the circulating current can be reduced.

Figure 6:
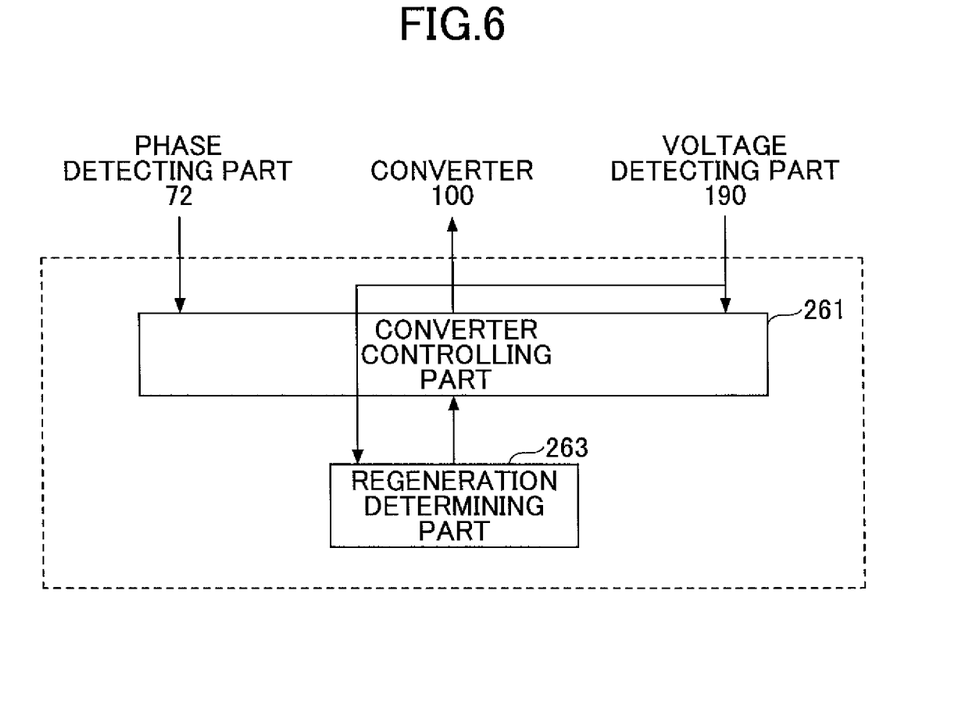
FIG. 6 is a functional block diagram of a controller.

FIG. 6 is a functional block diagram of the controller 26 which functions as a control apparatus of the converter 100. It is noted that the control apparatus of the converter 100 may be implemented by a control apparatus other than the controller 26.

The controller 26 includes a converter controlling part 261 and a regeneration determining part 263. The controller 26 includes one or more calculation processing apparatuses and a storage device for storing software (programs) and data, etc., such as a RAM and a ROM. The respective functional parts 261 and 263 of the controller 26 are functional parts for performing various processes for input data, using the calculation processing apparatus mainly, and are implemented by a hardware resource, a software resource or a combination thereof. The functions of the respective functional parts 261 and 263 are described with reference to FIG. 7.

Figure 7:
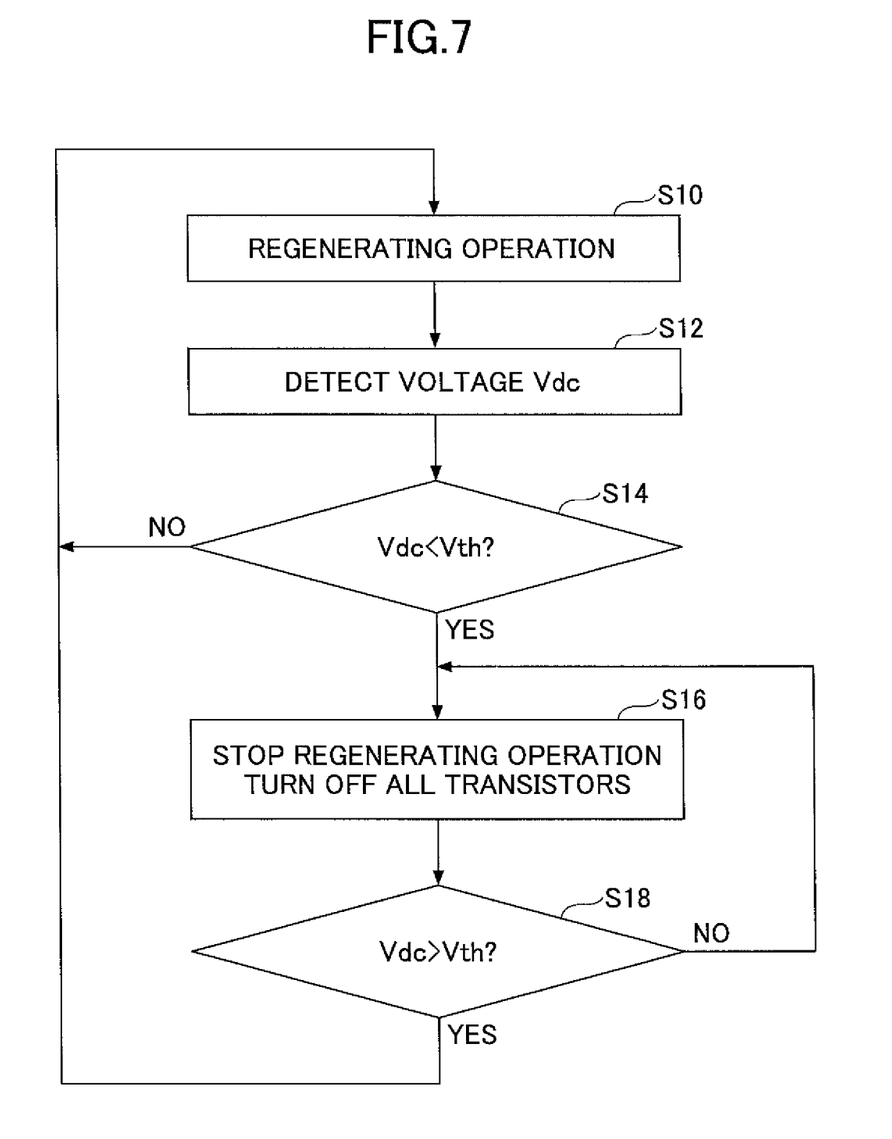
FIG. 7 is a flowchart for illustrating a method of controlling the converter according to the present embodiment.

FIG. 7 is a flowchart for illustrating an example of a method of controlling the converter 100 according to the present embodiment. The control process illustrated in FIG. 7 is executed by the controller 26 in connection with the regeneration of the servo motor 11 (at the time of decelerating the injection speed in the case of the servo motor 11).

In step 10, the converter controlling part 261 performs the regenerating operation by controlling the switching operation of the transistors of the bridge circuit 104 with the PMW generator 71 such that the alternating current output from the bridge circuit 104 has a shape of a sine wave.

In step 12, the regeneration determining part 263 acquires the voltage Vdc across the capacitor 301 of the DC link 300 with the voltage detecting part 190 to determine the regenerating status of the motor during the regenerating operation.

In step 14, the regeneration determining part 263 determines whether the voltage Vdc of the capacitor 301 of the DC link 300 is smaller than a predetermined threshold voltage Vth. The regeneration determining part 263 determines that the motor is in the decelerating status and a recoverable regenerative electric power is generated in the motor if the voltage Vdc is greater than or equal to the predetermined threshold voltage Vth. The converter controlling part 261 continues the regenerating operation of the bridge circuit 104 if it is determined by the regeneration determining part 263 that the voltage Vdc is greater than or equal to the predetermined threshold voltage Vth (i.e., it is determined that the recoverable regenerative electric power is generated in the motor). On the other hand, the regeneration determining part 263 determines that a regeneration stop criterion of the motor is met, if the voltage Vdc is smaller than the predetermined threshold voltage Vth.

In step 16, the converter controlling part 261 stops the regenerating operation of the bridge circuit 104 with the PMW generator 71 by tuning off all the transistors of bridge circuit 104, if it is determined by the regeneration determining part 263 that a regeneration stop criterion is met (i.e., if the voltage Vdc is smaller than the predetermined threshold voltage Vth). With this arrangement, the circulating current flowing through the rectifying part can be reduced. The regeneration determining part 263 may determine that the regeneration stop criterion is met, if the direct voltage value Vdc detected by the voltage detecting part 190 is smaller than the threshold voltage Vth.

In step 18 in order to determine the regenerating status of the motor, the regeneration determining part 263 acquires the voltage Vdc across the capacitor 301 of the DC link 300 with the voltage detecting part 190 and determines whether the voltage Vdc of the capacitor 301 of the DC link 300 is greater than the threshold voltage Vth. The regeneration determining part 263 determines that the recoverable regenerative electric power is not generated yet in the motor if the voltage Vdc is not greater than the threshold voltage Vth.

The converter controlling part 261 continues to turn off all the transistors of the bridge circuit 104 if it is determined by the regeneration determining part 263 that the voltage Vdc is not greater than the threshold voltage Vth (i.e., it is determined that the recoverable regenerative electric power is not generated in the motor).

On the other hand, the converter controlling part 261 restarts the regenerating operation by controlling the switching operation of the transistors of the bridge circuit 104 with the PMW generator 71 such that the alternating current output from the bridge circuit 104 has a shape of a sine wave, if it is determined by the regeneration determining part 263 that the voltage Vdc is greater than the threshold voltage Vth (i.e., it is determined that the recoverable regenerative electric power is generated in the motor).

In this way, according to the embodiment, by turning off all the transistors of the bridge circuit 104, the current flowing through the reactors of the harmonics component reducing part 63 is reduced and thus useless circulating current does not flow through the rectifier 102, thereby reducing power loss.

Further, since the bridge circuit 104 and the harmonics component reducing part 63 have only the regenerative current flowing therethrough (i.e., the powering current does not flow through the bridge circuit 104 and the harmonics component reducing part 63), the rating of the bridge circuit 104 and the harmonics component reducing part 63 can be decreased in comparison with a case where a powering line and a regenerative line is common. For example, it is possible to select the switching elements such as the transistors, the inductors, etc., according not to the powering electric power but the regenerative electric power. Further, the regeneration by the PWM control using the PMW generator 71 increases the power factor.

The present invention is disclosed with reference to the preferred embodiments. However, it should be understood that the present invention is not limited to the above-described embodiments, and variations and modifications may be made without departing from the scope of the present invention.

For example, according to the present embodiment, a voltage or a current as a dimension of a physical quantity is used for control; however, substantially the same control can be performed by equivalently using other dimensions of a physical quantity such as energy.

Further, in FIG. 7, the threshold voltage Vth in step 14 and the threshold voltage Vth in step 18 may be the same or may differ from each other, for example.

The present application is based on Japanese Priority Application No. 2011-163698, filed on Jul. 26, 2011, the entire contents of which are hereby incorporated by reference.

What is claimed is:

1. An injection molding machine, comprising:
a motor;
a driver circuit that drives the motor;
a rectifying part that supplies electric power to the driver circuit;
a capacitor provided between the driver circuit and the rectifying part;
a bridge circuit that converts direct electric power between the driver circuit and the rectifying part into alternating electric power;
a harmonics component reducing part connected to an alternating side of the bridge circuit; and
a regenerative line connected to the rectifying part in parallel, wherein
the bridge circuit and the harmonics component reducing part are provided in the regenerative line,
plural switching elements of the bridge circuit are switched between ON state and OFF state such that electric power of the motor is regenerated when a voltage of the capacitor is greater than or equal to a predetermined value, and all the switching elements are turned off when the voltage of the capacitor is smaller than the predetermined value, wherein the regenerative electric power of the motor is transmitted to an alternating current line part on an input side of the rectifying part through the regenerative line via the bridge circuit.

2. The injection molding machine of claim 1, further comprising: a controlling part that controls switching operations of the switching elements.

3. The injection molding machine of claim 1, wherein the harmonics component reducing part has an inductor.

* * * * *